Sept. 2, 1969     D. J. FERGLE     3,464,284
CONTROL FOR VEHICLE STEERING COLUMN
Filed July 11, 1967
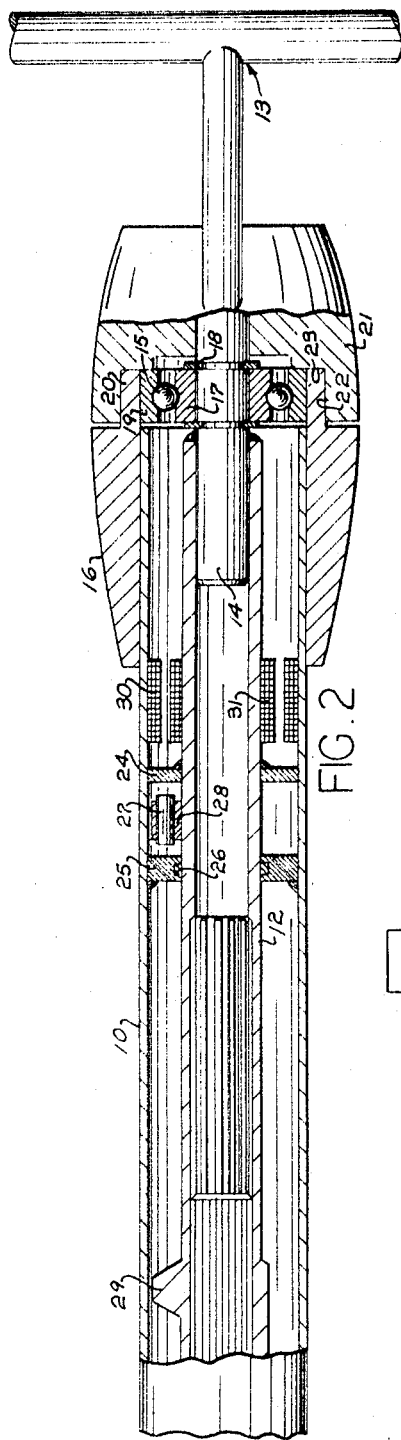
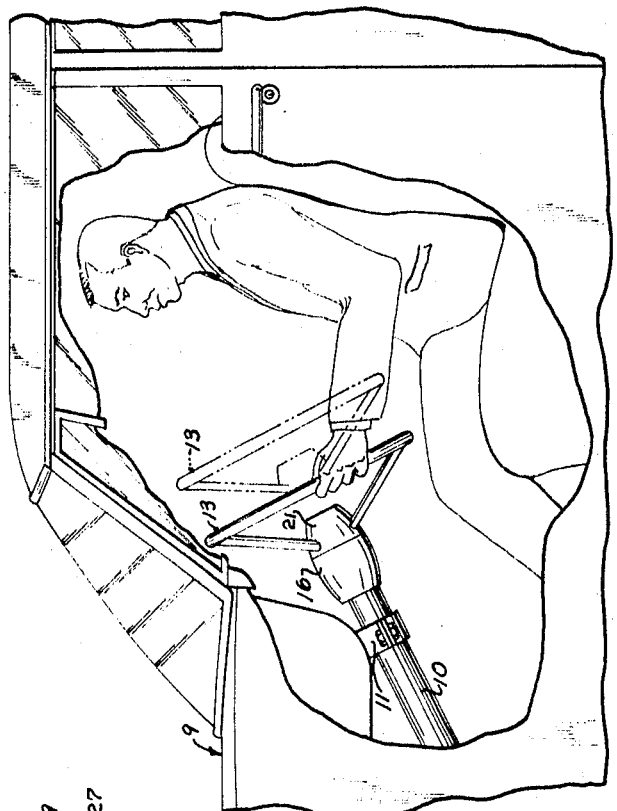
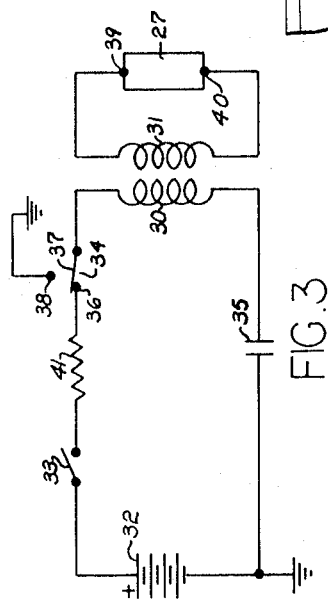
INVENTOR
DONALD J. FERGLE
BY *Yount, Raney, Flynn and Jarolli*
ATTORNEYS

United States Patent Office 3,464,284
Patented Sept. 2, 1969

3,464,284
CONTROL FOR VEHICLE STEERING COLUMN
Donald J. Fergle, St. Clair Shores, Mich., assignor to Eaton Yale & Towne Inc., Cleveland, Ohio, a corporation of Ohio
Filed July 11, 1967, Ser. No. 652,614
Int. Cl. B62d 1/18; F01b 29/08
U.S. Cl. 74—492        10 Claims

ABSTRACT OF THE DISCLOSURE

This control arrangement is used in association with a vehicle safety device, and more specifically with a collapsible steering column of a vehicle having an outer housing, which is stationary on the vehicle, a rotatable inner shaft attached to the steering wheel, and an electrically operated explosive charge for moving the inner shaft and the steering wheel longitudinally with respect to the outer housing. A control circuit for activating the explosive includes a capacitor which is charged from the vehicle battery through normally closed contacts of a collision sensing device and the primary winding of a transformer. The secondary winding of the transformer is connected across the explosive charge. The primary winding is mounted on the outer housing of the steering column. The secondary winding is mounted on the inner shaft of the steering column. When the vehicle is rapidly decelerated, such as in a collision, the sensing device disconnects the capacitor from the battery and discharges it to ground through the transformer primary winding, inducing a voltage across the secondary winding to fire the explosive charge.

---

This invention relates to a control arrangement for activating an electrically operated device, such as an explosive charge, and in particular to a control arrangement for activating an explosive charge for providing for movement of the steering wheel of a vehicle when the vehicle is rapidly decelerated, such as in a collision, to avoid injury to the vehicle driver.

Prior to the present invention, various safety arrangements for motor vehicles have been proposed in which an explosive charge is fired to move the vehicle steering wheel abruptly toward or away from the driver in response to the rapid deceleration of the vehicle, as sensed by a sensing device. For example, such an explosive charge may be arranged to act between a stationary outer housing of the steering column and an inner shaft of the steering column, which is telescoped into the outer housing and is rotatable therein, this inner shaft being connected at its outer end to the steering wheel and being coupled at its inner end to the steering linkage for the front wheels of the vehicle. The present invention is directed to a novel and improved electrical control arrangement which is especially adapted for use with such a steering column to ensure that the steering wheel will be abruptly moved toward or away from the driver in response to rapid deceleration of the vehicle.

The principal object of the present invention of the provision of a simple, reliable control circuit for operating an electrically operated device, such as an explosive charge, in response to rapid deceleration of the vehicle to provide for movement of the steering wheel of the vehicle relative to the driver.

Another object of the present invention is to provide a control arrangement which is operatively associated with a vehicle steering column having an outer hollow housing fixed to the vehicle, an inner shaft carrying the steering wheel and rotatably received telescopically in the outer housing, and an electrically operated explosive charge for abruptly moving the inner shaft either outward or inward along the outer housing to protect the driver by abruptly displacing the steering wheel toward or away from the driver when the vehicle undergoes rapid deceleration, such as in a collision or a sudden stop, and which control arrangement does not require potentially troublesome sliding contacts between the rotatable inner shaft and the non-rotatable outer housing of the steering column.

Still another object of the present invention is the provision of a new and improved control circuit for energizing an electrically actuated device on a vehicle and which includes a capacitor which is charged by the battery of the vehicle and which is discharged through the primary winding of a transformer, causing a voltage to be induced across the secondary winding of the transformer to energize the electrically actuated device.

Further objects and advantages of the present invention will be apparent from the following detailed description of a presently preferred embodiment thereof shown in the accompanying drawing made a part of this specification and in which:

FIG. 1 is a fragmentary side elevational view of an automobile having an explosive-operated steering column assembly and embodying the present invention;

FIG. 2 is a fragmentary longitudinal section through the steering column assembly of FIG. 1; and FIG. 3 is a schematic electrical circuit diagram showing the present control circuit.

The present invention provides an improved control circuit for energizing an electrically actuated device, which preferably actuates a safety device on a motor vehicle. In particular, the control circuit is adapted to activate an explosive charge associated with the steering column of the vehicle so as to provide for movement of the vehicle steering wheel so as to protect the vehicle driver from injury during a crash. In the preferred embodiment to be described hereinbelow, the explosive charge effects linear movement of the steering wheel; however, the explosive charge could effect pivoting or other movement of the steering wheel, as well as merely releasing the steering wheel for free movement.

FIG. 1 of the drawing illustrates a preferred embodiment of the present invention. Referring to FIG. 1, the steering column with which the present control circuit is used comprises a hollow, generally cylindrical, outer housing 10, which is attached to the body of the vehicle 9 by a bracket 11, and an inner shaft 12 (FIG. 2), which is telescopically received within the housing 10 and is rotatable with respect to the housing 10. The outer, upper end of the shaft 12 is suitably coupled rigidly to a steering wheel 13 in a conventional manner. The lower, inner end of the shaft 12 is suitably coupled through a steering linkage (not shown) to the front wheels of the vehicle so that the vehicle may be steered by turning the steering wheel 13.

For purposes of illustration only, the steering column shown is of the type in which the inner shaft 12 and steering wheel 13 are movable longitudinally of the fixed housing 10 in response to a rapid deceleration of the vehicle, such as would be produced by a collision. For example, the inner shaft 12 and steering wheel 13 may move outward (i.e., toward the driver of the vehicle) when such deceleration occurs, from the full-line position to the position shown in phantom in FIG. 1 in order to reduce the impact force of the driver as he is thrown forward against the steering wheel 13. Alternatively, the inner shaft 12 and steering wheel 13 may move inward (i.e., away from the driver) when such deceleration occurs.

FIG. 2 illustrates a steering column of the type in which the inner shaft 12 and steering wheel 13 move outward in response to rapid deceleration of the vehicle.

Referring to this figure, the outer end of the inner shaft 12 of the steering column is welded or otherwise attached to a stub shaft 14 projecting longitudinally from the steering wheel 13. A ball bearing 15 is engaged between the stub shaft 14 and an annular body 16 on the outside of the outer housing 10 of the steering column. The inner race 17 of ball bearing 15 is secured axially on the stub shaft 14 by snap rings 18. The outer race 19 of the bearing is normally tightly received within a longitudinally projecting, annular extension 20 on the outer end of body 16. The steering wheel 13 and stub shaft 14 carry a cap 21 having a longitudinally projecting, annular extension 22 on its inner end which snugly, but slidably, engages the outer end extension 20 on body 16. At the attached end of the extension 22, the cap 21 presents an annular radially disposed, internal shoulder 23 against which the outer axial end of the outer bearing race 19 abuts.

The inner shaft 12 of the steering column rigidly carries an annular, radially disposed, first plate 24. For example, plate 24 may be welded to shaft 12. The outer peripheral edge of this plate slidably engages the inside of the outer housing 10 of the steering column.

The outer housing 10 of the steering column rigidly carries an annular, radially inwardly projecting, second plate 25 which is spaced longitudinally from the first plate 24. For example, plate 25 may be welded to the inside of housing 10. An O-ring seal member 26 is carried by the inside peripheral edge of plate 25 and it sealingly engages the ouside of the inner shaft 12 of the steering column.

An explosive charge 27 is carried by a fitting 28 attached to the inner shaft 12 of the steering column between the plates 24 and 25. Preferably, this explosive charge 27 is a pyrotechnic device, known as a squib, which may be activated by electric current to create explosive gases. When such an explosion occurs, the gases act against the first plate 24 to force this plate and the inner shaft 12, to which it is attached, longitudinally outward along the stationary outer housing 10 of the steering column. Consequently, the steering wheel 13, which is rigidly coupled to the inner shaft 12 of the steering column, moves outward from the full-line position in FIG. 1 to the phantom-line position. Also, the entire ball bearing assembly 15 moves longitudinally in unison with the inner shaft 12, with the outer race 19 of the ball bearing being forced out of the annular end extension 20 on the body 16.

The inner shaft 12 of the steering column carries a suitable radially outwardly projecting stop lug 29 (FIG. 2) for engagement with the plate 25 on the outer housing 10 of the steering column to limit the outward movement of the inner shaft 12 and the steering wheel in response to the explosion of the charge 27.

In accordance with the present invention, the activation of the explosive charge 27 is controlled by an electric circuit which includes a transformer having a low impedance primary winding 30 (FIG. 2), which is mounted on the inside of the outer housing 10 of the steering column, and a secondary winding 31 mounted on the inner shaft 12 of the steering column. Alternatively, the housing 10 could function as the transformer core. In the normal position of the inner shaft 12 longitudinally of the outer housing 10 (i.e., before the explosive charge 27 is activated), the primary and secondary windings 30, 31 of the transformer are sufficiently closely spaced to provide a substantial inductive coupling between them in all rotational positions of the steering wheel 13 and the inner shaft 12 of the steering column.

Referring to FIG. 3, the positive terminal of an electrical power source 32, preferably the vehicle battery, is connected through a pair of series-connected switches 33 and 34 to one end of the transformer primary winding 30. A capacitor 35 is connected between the opposite end of winding 30 and the opposite terminal of battery 32, which is grounded to the vehicle body. A resistor 41 is connected between switches 33 and 34 to limit the rate at which the capacitor 35 can be charged from the battery 32. Other circuitry could be designed which does not require a resistor, such as 41; however, for purposes of simplicity, such a circuit has not been illustrated.

Switch 33 is constituted by a set of contacts of a normally open ignition switch for the vehicle engine, which the driver closes by a key to start the engine.

Switch 34 is a collision-sensing device, such as a switch or the like, having a first fixed contact 36, a mobile contact 37, and a second fixed contact 38, which is grounded. Normally, the mobile contact 37 engages the first fixed contact 36 for connecting the transformer primary winding 30 and the capacitor 35 in series across the battery 32 whenever switch 33 is closed. However, whenever the vehicle is rapidly decelerated, such as by a collision, the mobile contact 37 disengages from the first fixed contact 36 and moves into engagement with the grounded second fixed contact 38.

The secondary winding 31 of the transformer is connected to the opposite terminals 39, 40 of the explosive device 27, preferably through plug-and-socket connectors which may be readily separated when the inner shaft 12 of the steering column moves longitudinally outward with respect to the stationary outer housing 10 of the steering column.

In the operation of this control circuit, when the driver turns on the vehicle engine, the capacitor 35 is charged from the battery 32 through the now closed contacts of the first switch 33, the normally closed contacts 36, 37 of the switch 34 and the transformer primary winding 30. This charging of the capacitor is at a relatively slow and gradual rate, so that any voltage appearing across the transformer secondary winding 31 is negligibly small and is insufficient to fire the explosive charge 27. Resistor 41 has an ohmic value sufficiently high to thus limit the charging rate of the capacitor. After a predetermined time interval, substantially the full battery voltage will appear across the plates of capacitor 35.

Whenever the vehicle is decelerated rapidly, such as in a collision or sudden panic stop, the switch 34 will open its contacts 36, 37 and close its contacts 37, 38. Consequently, the capacitor 35 will discharge abruptly through the low impedance of the transformer primary winding 30 to ground. This discharge of the capacitor will induce a relatively high voltage across the transformer secondary winding 31 sufficient to fire the explosive charge 27, which will cause inner shaft 12 of the steering column and the steering wheel 13 to move outward, as described.

From the foregoing description, it will be apparent that the present invention provides a relatively simple yet reliable control circuit for firing an explosive charge to effect the desired movement of the steering wheel when the vehicle undergoes a rapid deceleration. The provision of the transformer in this control circuit eliminates the need for potentially troublesome rotating electrical contacts in order to accommodate the rotation of the steering wheel with respect to the fixed outer housing of the steering column during normal operation of the vehicle.

While a presently preferred embodiment of the present invention has been described in conjunction with a particular type of steering column assembly in which the steering wheel moves outward when rapid deceleration of the vehicle occurs, it is to be understood that the invention is susceptible of other embodiments differing from the particular arrangement shown. For example, the present control circuit may be used with a steering wheel assembly designed to linearly move or pivot the steering wheel away from the driver in response to rapid deceleration of the vehicle. Moreover, the steering wheel may be released by the explosive for free movement due to impact of the driver on the steering wheel due to the rapid deceleration of the vehicle.

Furthermore, the present invention could be utilized in association with the safety device shown in United States application to Carey, Ser. No. 625,518, filed Mar. 23, 1967 and assigned to the assignee of this application. In this application, a crash resistant bag is mounted on the steering column of a vehicle and is inflated by activation of an explosive. The control circuit disclosed herein could be utilized for activating the explosive.

Having described my invention, I claim:

1. The combination of a vehicle safety device having an electrically operated means for actuating the safety device and a control for actuating said electrically operated means, said control comprising capacitor means, means for charging said capacitor means from an energy source on the vehicle, sensing means responsive to the vehicle encountering a collision condition for discharging said capacitor means, and means for operating said electrically operated means to actuate said safety device in response to the discharge of said capacitor means, said safety device comprising a steering column having provision for movement of the steering wheel, and said electrically operated means providing for movement of the steering wheel when said electrically operated means is actuated in response to the discharge of said capacitor means.

2. The combination according to claim 1 wherein said sensing means for discharging said capacitor means comprises switch means having a grounded contact which is normally disconnected from said capacitor means, and deceleration responsive means for connecting said capacitor means to said grounded contact in response to rapid deceleration of the vehicle.

3. The combination according to claim 2 wherein said means for operating said electrically operated means comprises a tranesformer having a primary winding connected between said switch means and said capacitor means and a secondary winding inductively coupled to said primary winding and connected to said electrically operated means to operate the latter in response to the discharge of said capacitor means.

4. The combination of a control circuit and a steering column on a vehicle, the steering column having an outer hollow housing, an inner shaft rotatably received within said outer housing, a steering wheel attached to said inner shaft, and electrically operable means carried on said steering column, said control circuit comprising a transformer having a primary winding connected to an electrical power source on the vehicle and a secondary winding connected to said electrically operable means, and means operable in response to rapid deceleration of the vehicle for passing a current surge through the primary winding on the transformer to induce across the secondary winding a voltage effective to operate said electrically operable means on said steering column.

5. The combination according to claim 4 wherein said primary winding of said transformer is mounted on said outer housing of the steering column, and said secondary winding is mounted on said inner shaft of the steering column.

6. The combination according to claim 4 wherein said inner shaft is movable longitudinally of said outer housing, and said electrically operable means comprises an explosive charge arranged to act between said outer housing and said inner shaft of the steering column to move said inner shaft longitudinally of the outer housing.

7. The combination according to claim 4 wherein said means for passing a current surge through the primary winding of the transformer comprises a deceleration-responsive switch having normally contacts connected between one side of said primary winding and a battery on the vehicle, and a capacitor connected to the opposite side of said primary winding to be charged from the vehicle battery through said normally closed contacts of the switch and said primary winding, said switch having means responsive to rapid deceleration of the vehicle for opening said normally closed contacts and for connecting said one side of the primary winding to ground to discharge the capacitor through said primary winding to produce said abrupt current surge.

8. The combination according to claim 1 wherein said electrically operable means is supported on said inner shaft, said primary winding is mounted on said outer housing of the steering column, and said secondary winding is mounted on said inner shaft of the steering column.

9. The combination of an explosive device for moving a member on a vehicle and a control for actuating the explosive device said control comprising a capacitor, means for charging said capacitor from an energy source on the vehicle, sensing means for discharging said capacitor in response to rapid deceleration of the vehicle, and means for firing said exposive device in response to the discharge of said capacitor, said last-mentioned means comprising a transformer having a primary winding connected in series between said capacitor and said means for discharging the capacitor, and a secondary winding inductively coupled to said primary winding and connected to said explosive device to fire the latter in response to the abrupt discharge of the capacitor through said primary winding.

10. The combination according to claim 9 wherein said means for discharging the capacitor comprises a sensor having normally closed contacts connected in series between the battery and the primary winding of the transformer, said sensor having a normally open grounded contact, and means for connecting said grounded contact to the primary winding of the transformer and for opening said normally closed contacts in response to rapid deceleration of the vehicle.

References Cited

UNITED STATES PATENTS

| 2,644,117 | 6/1953 | Schmitt et al. | 317—80 |
| 3,166,689 | 1/1965 | Buntenbach | 317—80 |
| 3,308,903 | 3/1967 | Sobel et al. | 180—96 |

MILTON KAUFMAN, Primary Examiner

U.S. Cl. X.R.

60—26.1

UNITED STATES PATENT OFFICE
CERTIFICATE OF CORRECTION

Patent No. 3,464,284     Dated September 2, 1969

Inventor(s) Donald J. Fergle

It is certified that error appears in the above-identified patent and that said Letters Patent are hereby corrected as shown below:

Column 5, line 31, for "trnaesformer" read -- transformer --; line 48, for "on" read -- of --. Column 6, line 7, insert -- closed -- after "normally".

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents